E. F. CORBETT.
TEA AND COFFEE SAVER.
APPLICATION FILED JUNE 14, 1909.
949,523. Patented Feb. 15, 1910.
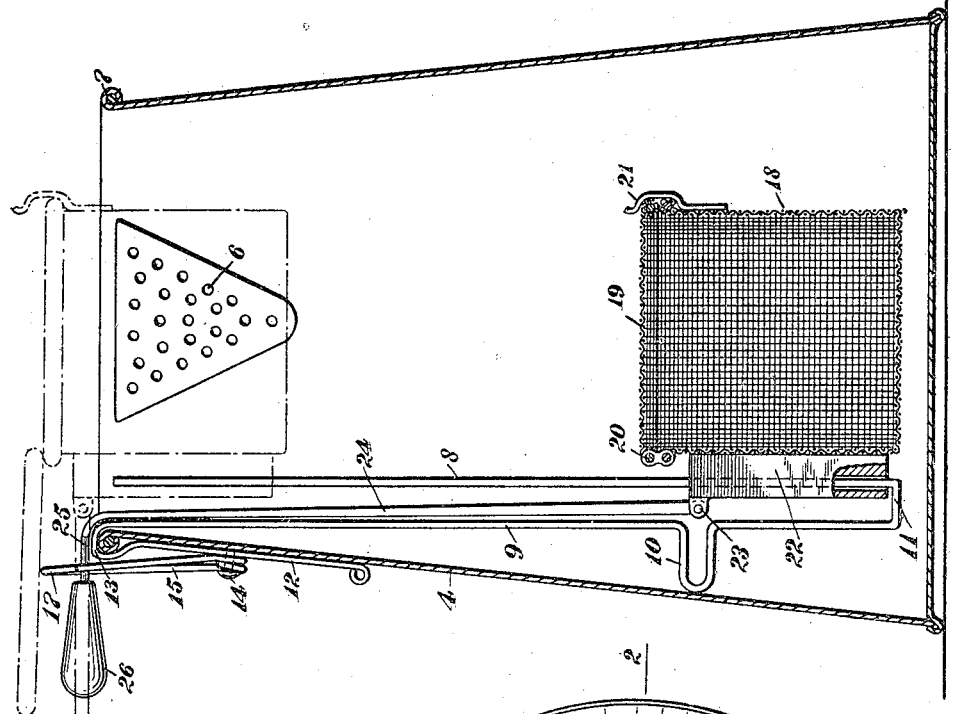
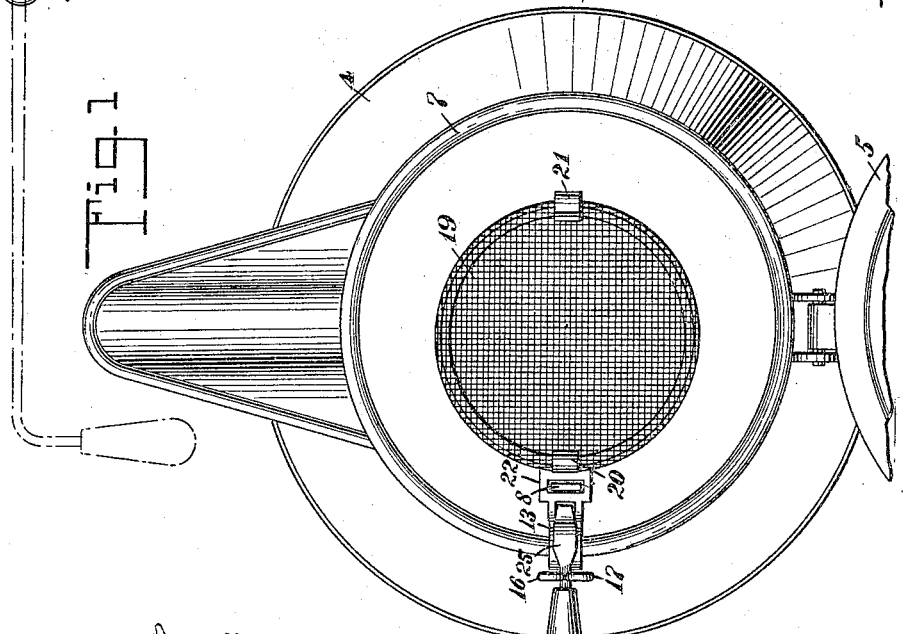
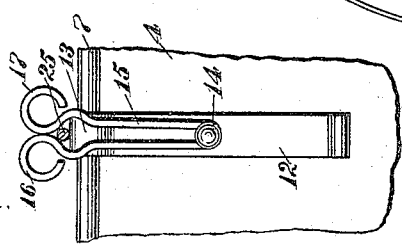
WITNESSES
J. A. Brophy
Walton Harrison
INVENTOR
Ellsworth Frederick Corbett
BY Munn & Co
ATTORNEYS
ANDREW B. GRAHAM CO., PHOTO-LITHOGRAPHERS, WASHINGTON, D. C.

UNITED STATES PATENT OFFICE.

ELLSWORTH F. CORBETT, OF NEW YORK, N. Y.

TEA AND COFFEE SAVER.

949,523.  Specification of Letters Patent.  Patented Feb. 15, 1910.

Application filed June 14, 1909. Serial No. 502,007.

*To all whom it may concern:*

Be it known that I, ELLSWORTH FREDERICK CORBETT, a citizen of the United States, and a resident of the city of New York, borough of the Bronx, in the county and State of New York, have invented a new and Improved Tea and Coffee Saver, of which the following is a full, clear, and exact description.

My invention relates to tea and coffee savers, my more particular purpose being to provide a cage movably mounted within a pot and adapted to be raised and lowered in order to expose the tea or coffee to the liquid.

My invention further relates to means for holding the cage in a plurality of different positions, so that the cage and its contents may be in one instance completely submerged and in another instance completely raised out of the liquid.

Reference is to be had to the accompanying drawings forming a part of this specification, in which similar characters of reference indicate corresponding parts in all the figures.

Figure 1 is a fragmentary plan showing a tea or coffee pot provided with my improved mechanism, the parts occupying such position that the cage for containing the tea or coffee occupies its lowermost position; Fig. 2 is a substantially central section, on the line 2—2 in Fig. 1, through the device, showing in full lines the cage as occupying its lowermost position and in dotted lines the cage as raised, and Fig. 3 is a fragmentary elevation of the clasp for holding the handle for supporting the cage.

A pot 4 is provided with a lid 5 and with a strainer plate 6, and also with a rim 7 to be engaged by the lid 5. A vertical guide rod 8 is disposed parallel to a supporting rod 9 having a loop 10 therein and connected at its bottom with the guide rod 8 by a horizontal portion 11, all of these parts being integral. A portion 12 of the supporting rod 9 is bent downwardly so as to form a saddle 13 which rests upon the rim 7 of the pot 4. Mounted upon the downwardly-turned portion 12 is a pin 14, and supported by aid thereof is a clasp 15 provided with eyes 16, 17 which are adapted to be sprung apart. A cage 18 is provided with a top 19 connected therewith by a hinge 20 and a clasp 21. This cage 18 is connected rigidly with a slide 22 which encircles the guide rod 8 and is adapted to move vertically in relation to the same.

Connected to the slide 22 by aid of a pivot 23 is a rod 24 which is provided with a flattened portion 25 serving as a saddle and adapted to engage the saddle 13. The rod 24 is further provided with a handle 26.

The operation of my device is as follows: A charge of tea or coffee is placed within the cage 18 and the top 19 is closed and secured by the clasp 21. The operator now raises the handle 26, detaching it, if need be, from the clasp 15. To do this the operator merely raises the rod 24 by aid of the handle 26 and thus causes the eyes 16, 17 (see Fig. 3) to spring apart. By aid of the handle 26 the slide 22 is now lowered, following as it does the guide rod 8, so that the cage 18 is let down into the water contained within the pot 4. The cage remains in this position until the tea or coffee is thoroughly steeped in the liquid, the cage being of such depth that the charge of tea or coffee within the cage is totally submerged. The essence of the tea or coffee being removed by steeping in the water, the operator next grasps the handle 26, and by aid thereof raises the slide 22 and cage 18 out of the liquid. The operator next shifts the rod 24 to the left according to Figs. 1 and 2, and by forcing the rod angularly downward between the eyes 16, 17 causes the latter to spring apart and then approach each other so as to engage the upper surface of the rod 24 now in a substantially horizontal position, as indicated by dotted lines in Fig. 2. This holds the cage 18 in its elevated position as indicated by dotted lines in Fig. 2, and while in this position the liquid contained in the charge of tea or coffee and in the cage 18 drips gradually into the pot 4.

The device above described is very economical in practice, and moreover is exceedingly useful in enabling the operator to apportion the precise length of exposure desired for the tea or coffee relatively to the liquid.

Having thus described my invention, I claim as new and desire to secure by Letters Patent:

1. The combination of a containing vessel, a guide rod mounted therein, a supporting rod connected with said guide rod and provided with a laterally extending portion for engaging the interior of said containing vessel in order to hold said guide rod in a vertical position, a slide mounted upon said guide rod, means controllable at will for adjusting said slide to different levels upon said guide rod, and a cage mounted upon said slide and adapted to hold a charge of tea or coffee.

2. The combination of a containing vessel, a guide rod mounted therein, a slide movable relatively to said guide rod, a cage connected with said slide and movable thereby, a rod pivotally connected with said slide, said rod being provided with a bent portion to be supported by the upper edge of said containing vessel in order to support said cage above the bottom of said vessel, and means for engaging said last-mentioned rod when the latter is swung outwardly, in order to support said cage at a point near the top of said containing vessel.

3. The combination of a containing vessel, a guide rod mounted therein, a supporting rod connected with said guide rod for the purpose of sustaining the latter, said supporting rod being provided with a laterally extending portion for engaging the interior of said containing vessel, said supporting rod being further provided with means for suspending it from the upper edge of said containing vessel, a slide mounted upon said guide rod and movable in relation to the same, a cage carried by said slide, a second rod journaled relatively to said slide and adapted to be swung outwardly by hand, said second-mentioned rod being provided with a saddle for supporting said slide and said cage relatively to the upper surface of said containing vessel, and a handle connected with said second-mentioned rod for the purpose of raising and lowering said slide and said cage.

4. The combination of a containing vessel, a guide rod mounted therein, a slide movable relatively to said guide rod, a cage disposed within said containing vessel and carried by said slide, a second rod pivoted upon said slide, a handle mounted upon said second-mentioned rod for the purpose of raising and lowering said slide and said cage, and means for holding said second-mentioned rod in different positions for the purpose of supporting said slide and said cage at different altitudes relatively to said guide rod.

5. The combination of a containing vessel, a guide rod mounted therein, a slide movable relatively to said guide rod, a cage carried by said slide, a rod pivoted upon said slide and adapted to be swung outwardly therefrom by hand, and a fastening member secured relatively to said containing vessel and adapted to engage said second-mentioned rod, for the purpose of holding it in different positions in order to enable said cage to be adjusted to different heights relatively to said containing vessel.

In testimony whereof I have signed my name to this specification in the presence of two subscribing witnesses.

ELLSWORTH F. CORBETT.

Witnesses:
RENATUS PAUL CASPAR,
DAVID J. CONROY.